United States Patent [19]

Morey

[11] 4,070,273
[45] Jan. 24, 1978

[54] GLASS RECOVERY

[75] Inventor: Booker W. Morey, Pasadena, Calif.

[73] Assignee: Occidental Petroleum Corporation, Los Angeles, Calif.

[21] Appl. No.: 603,868

[22] Filed: Aug. 11, 1975

[51] Int. Cl.$^2$ .............................................. B03B 1/00
[52] U.S. Cl. ........................................ 209/3; 209/12; 209/166; 241/24
[58] Field of Search ..................... 209/12, 1, 166, 3, 2; 241/20, 24, DIG. 38, 17

[56] References Cited

U.S. PATENT DOCUMENTS

| 565,577 | 8/1896 | Stanley | 209/12 |
|---|---|---|---|
| 2,307,059 | 1/1943 | Moore | 209/2 X |
| 2,990,958 | 7/1961 | Green | 209/166 |
| 3,145,163 | 8/1964 | Dancey | 209/12 |
| 3,424,308 | 11/1969 | Fensky | 209/12 X |
| 3,650,396 | 3/1972 | Gillespie | 209/12 X |
| 3,720,380 | 3/1973 | Marsh | 241/24 X |
| 3,725,538 | 4/1973 | Brewer | 209/12 X |
| 3,736,111 | 5/1973 | Gardner | 241/DIG. 38 |
| 3,817,458 | 6/1974 | Gilberto | 241/24 X |
| 3,897,215 | 7/1975 | Davidson | 209/12 X |
| 3,945,575 | 3/1976 | Marsh | 241/20 |

OTHER PUBLICATIONS

Proceedings of the Third Min. Waste Util. Symposium, Mar. 1972, 311-321, Morey and Cummings.

Primary Examiner—Robert Halper
Attorney, Agent, or Firm—Christie, Parker & Hale

[57] ABSTRACT

A process is disclosed for recovering purified glass from solid waste which includes a predominantly organic fraction and a predominantly inorganic fraction both of which contain glass particles. The predominantly inorganic fraction is further subdivided into a glass-rich fraction containing glass, inorganic, and organic constituents. The organic constituents are initially separated from the glass-rich fraction. The organics-free fraction is comminuted and screened to remove coarse particles greater than a first predetermined mesh size. The residue is classified to remove fine particles less than a second mesh size. The resultant mixture, after removal of coarse and fine particles, is subjected to froth flotation to form a float containing predominantly glass which is recovered for further use.

12 Claims, 3 Drawing Figures

GLASS RECOVERY

BACKGROUND OF THE INVENTION

Immense, ever-increasing quantities of solid wastes are generated each day which presents major collection, disposal and nuisance problems. The cost of disposal of solid wastes ranks third amongst the cost of public schooling, highways and general municipal expenses.

The quantity of trash that accumulates daily in large cities is truly staggering. It is estimated that each individual generates about 4 to 6 pounds of trash per day. Furthermore, the trash from industrial sources amounts to an equivalent of an additional 5 to 10 pounds per person per day. The average cost of disposal is approximately $5 to $10 per ton of trash.

Conventional methods of disposal, such as landfill and incineration, are becoming prohibitively expensive and are creating serious pollution problems.

Landfill areas, for instance, are becoming increasingly fewer in number and further from the municipalities where the principal amount of trash is generated.

In the past, there have been developed various methods for the treatment of solid waste for recovery of values contained therein for recycle back to the economy. A general method of processing waste material involves segregating organic matter from inorganics which include metals, concrete, bricks, glass and the like. The predominantly organic fraction may be processed for recovery as saleable materials such as paper pulp, and the balance pyrolized to form char and a gaseous stream containing chemicals which may be condensed as saleable commodities. Char has an economic value of its own. As to the predominantly inorganic fraction, ferrous materials may be separated magnetically prior to, or following, separation of the organics. The remaining inorganics are comminuted by crushing or grinding into particles of fine size. Some may be separated by screening, and others may be separated by heavy media separation techniques.

Crushed particulate glass particles can be of value if recovered from such waste material. Typically, the predominantly organic fraction described above contains some glass particles; and the predominantly inorganic fraction contains glass particles as well as other inorganic and organic constituents.

SUMMARY OF THE INVENTION

According to the present invention there is provided a process for the separation of glass particles from inorganic matter containing a glass-rich fraction which includes glass, inorganic and organic constituents.

Briefly, the process involves passing the glass-rich fraction to a classification zone, such as a screw classifier in which the glass-rich fraction is moved countercurrent to water flow to separate the organic constituents from the remainder of the glass-rich fraction. The organics-free, glass-rich fraction is comminuted to enable screen classification. The comminuted, organics-free, glass-rich fraction is then screened to remove coarse particles greater than a first predetermined mesh size. The residue from the screening operation is classified to remove fine particles less than a second preselected mesh size. The resultant mixture, after removal of the coarse and fine particles, is subjected to froth flotation using a beneficiating amount of a flotation reagent for glass to form a float containing predominantly glass and an essentially glass-free tailing. The glass is recovered from the float as a product, and the tailing is discarded as landfill.

Preferably, the glass-rich mixture segregated for flotation has a particle size in the range of about 20 to about 325 mesh to facilitate flotation of the glass particles.

In a preferred form of the invention, the predominantly organic fraction is processed to produce a glass-rich fraction which is degreased in preparation for being passed to the classifier zone where the organic constituents are removed.

DRAWINGS

DETAILED DESCRIPTION

Figure 1:
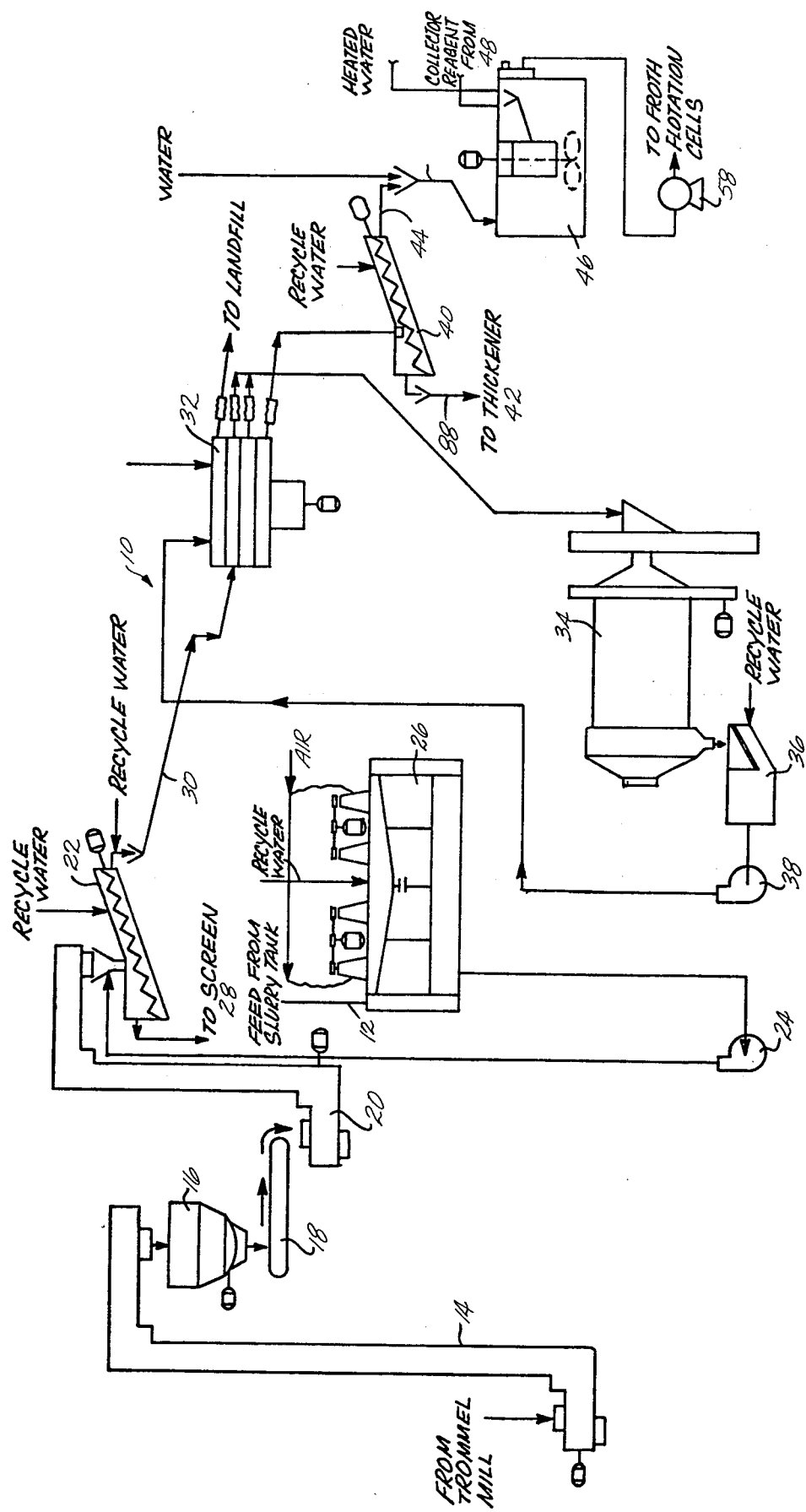
FIG. 1 is a schematic flow diagram illustrating particle separation and comminuting steps in preparation for a flotation operation in a glass recovery process according to this invention.

Referring to FIG. 1, a glass recovery system 10 recovers glass from solid waste having a predominantly organic fraction and a predominantly inorganic fraction. The predominantly organic fraction includes a fraction initially separated as a glass-rich water slurry of inorganic constituents. This glass-rich slurry typically contains over about 40% glass by weight of solid particles in the slurry. The glass-rich slurry is pumped through a line 12 from a slurry tank (not shown) from operations which process the predominantly organic fraction to the glass recovery system 10.

The predominantly inorganic fraction comprises a glass-rich mixture containing glass particles along with other inorganic and organic constituents. The predominantly inorganic fraction is fed to the glass recovery system 10 from a trommel mill (not shown) where the inorganic fraction undergoes a screening separation process prior to further processing by the glass recovery system 10. Typically, the inorganic fraction fed to the recovery process 10 from the trommel mill contains particles in a size range of 0.5 inch and less.

Typical of the glasses to be principally recovered in accordance with this invention are common bottle or container glass, window or plate glass, and incandescent lamp envelopes. They are generally known as soda-lime glasses. The analysis of such glasses is from about 70 to 73% by weight silicon dioxide, from 11 to about 18% by weight sodium oxide, from about 7 to about 17% by weight calcium oxide, the remainder essentially being other metal oxides such as colorants and the like. Included in the calcium oxide analysis is magnesium oxide, a substitute for calcium oxide to reduce cost. Magnesium oxide may be present in an amount of from about 3 to 5% by weight based on the total weight of the glass. The most common species is formed from a mixture of about 72% by weight silica, about 15% by weight soda, about 10% by weight lime and magnesia, about 2% by weight alumina, and about 1% by weight miscellaneous oxides.

The "organic" constituents of the predominantly organic fraction include cellulosic materials, plastics, rubber stock, and animal waste. Included in the meaning of "cellulosic materials" are paper, tree trimmings and bark, sawdust, crop waste, vegetable and fruit processing waste, and the like. "Plastics" include discarded household plastics, as well as the waste of industrial polymer forming and processing operations. "Rubber stock" includes waste tires. "Animal waste" includes household discards, slaughter house wastes, poultry processing wastes, manure and the like.

Referring to FIG. 1, the glass stream from the trommel mill (not shown) is carried by a conveyor elevator 14 to the glass plant feed storage bin 16. The glass plant feed storage bin 16 has a live bottom so that the glass is vibrated onto a weigh feeder 18 which controls the rate of glass feed to the glass plant. From the weigh feeder the glass is lifted by a conveyor elevator 20 to a spiral classifier 22.

Joining the glass plant feed at the spiral classifier 22 is the glass plant feed slurry stream in the line 12 from the slurry tank (not shown) in the predominantly organic fraction processing operation. Before the stream is pumped to the spiral classifier by pump 24, it is cleaned and degreased with recycle water and air in a degreaser stage 26 comprising froth flotation cells used without additional reagents.

Recycle water washes the main glass stream 30 from the first spiral classifier 22 to a vibrating screen separator 32. In the separator all particles undergo a classification operation. By the term "classification" is meant the separation particles by density, gravity, and/or particle size differential. In the separator the particles in stream 30 are screened to remove particles less than 20 mesh. The particles remaining are milled and then screened to remove particles greater than ¼ inch in size. The oversize particles are used for landfill. This vibrating screen works in cooperation with a rodmill 34. The purpose of this combination is to reduce the particle size of the glass to a size suitable for purification of the glass by froth flotation. Thus glass larger than about 20 mesh enters the rodmill in which it is further comminuted and dropped into the rodmill recycle tank 36. From this tank a glass slurry stream is returned by pump 38 to the vibrating screen, and those particles which are comminuted to a size less than about 20 mesh are carried to a second spiral classifier 40. Recycle water is added to the rodmill discharge tank 36 to maintain an adequate supply of water in the loop to the vibrating screen.

Comminution devices other than a rodmill may be used, including gyratory crushers, hammermills, cage mills, cone crushers, roll crushers, and the like. The term "comminution" is used herein to refer to any physical act of size reduction, including, but not limited to, chopping, crushing, tearing, shredding and grinding by suitable machinery. A rodmill is preferred because it is particularly satisfactory for breaking friable or brittle materials, including large glass particles, into small fragments which pass through the subsequent screening operation, while the more ductile materials are flattened for separation by screening.

The second spiral classifier 40 eliminates particles which are too small for satisfactory froth flotation. Recycle water is used in the second spiral classifier to wash particles less than about 325 mesh into a recycle water stream flowing to the recycle water thickener 42 (shown in FIG. 3). Thus the effluent stream 44 from the top of the spiral classifier has a particle size between about 20 mesh and about 325 mesh, a size distribution which is optimum for recovery by froth flotation and sale potential of the product glass. This stream is washed by water into an agitated conditioner tank 46.

Figure 2:
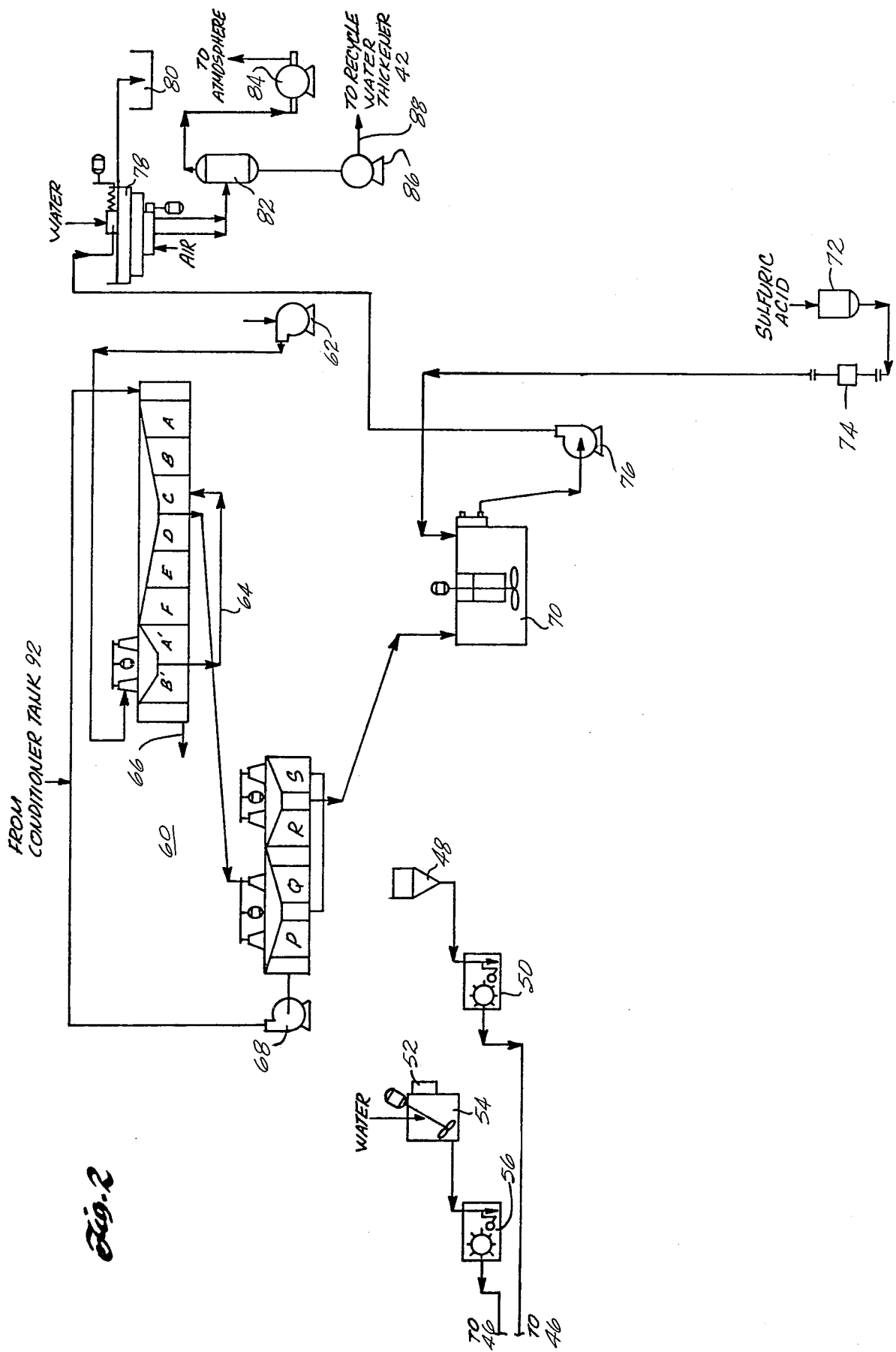
FIG. 2 is a schematic flow diagram illustrating the details of the flotation operation.

A beneficiating amount of collector reagent with or without conventional frothing agent and/or extenders are added to the conditioner tank 46. With reference to FIG. 2, the frothing agent is pumped from a storage tank 48 by a metering pump 50. The collector reagent with water is heated by an immersion heater 52 to about 100° F in an agitated tank 54. The flow rate of collector reagent to the conditioner tank 46 is controlled by a metering pump 56.

The comminuted mass of inorganic matter which is mixed with the particulate glass subjected to froth flotation essentially consists of particulate inorganic materials which are substantially non-responsive to the beneficiating action of the collector reagent which concentrates the glass particles in the float flotation operation.

The beneficiating collector reagent typically may be an amine or a mixture of amines which, for reasons of economy, may be extended using conventional hydrocarbons such as kerosene, mineral oil, fuel oil and the like. The typical frothing agent is a material such as pine oil, methyl isobutyl carbinol, methyl glycol ether, and the like, as are generally known to the art.

The amine flotation reagents which may be used in accordance with the present invention, are not narrowly critical, and are generally obtained by the reaction of a lower molecular weight amine with a straight or branched chain alkene; a straight or branched chain alkene; a saturated or unsaturated or hydroxylated fatty acids or a hydrocarbon containing additional secondary or tertiary amine groups.

Illustrative, but no wise limiting of the amines which may be used as selective flotation reagents for the separation of particulate glass from a comminuted mass of inorganic matter, there may be mentioned tallowamine acetate; N-hexadecylamine acetate; N-octadecylamine acetate, laurylamine acetate; primary amines derived from cocoa fatty acids, tallow fatty acids, soya fatty acids, castor fatty acids, oleylamine acetate; dihydroabietyl amine, primary tallow amine hydrochlorides, cotton-seed oil amine hydrochlorides, N-oleyl-1,3-propylene diamine; N-tall oil-1,3-propylene diamine; N-tallow oil-1,3-propylene diamine and the like.

Other amines which may be used as flotation reagents in accordance with the practice of this invention there may be mentioned the condensation products of tall oil and diethylene triamine, dicocoamine, the reaction products of tall oil and dimethylamine propyl amine, tricocoamine, trilaurelamine, and the like.

The predominantly glass fraction with conditioner is transferred by a pump 58 (see FIG. 1) to a series of froth flotation cells 60. Air is blown into the cells by blower 62 to form the froth.

The glass slurry enters the rougher cells, A through F, and then flows to cleaner cells P, Q, and recleaner cells R, S. The essentially glass-free particulates in the rougher cells sink to the bottom and enter the scavenger cells A' and B'. Any residual glass in the scavenger cells floats to the top and is carried by line 64 to the bottom of the rougher cells. Excess water and non-floating particulates flow from the bottom of the scavenger cells through line 66 to the recycle water thickener 42 (see FIG. 3). The nonfloated fraction from the cleaner flotation cells is transferred by a froth flotation transfer cell pump 68 to the rougher flotation cells A through F.

The purified glass stream from the recleaner flotation cells flows into an agitated tank 70 where the froth is broken and glass is washed with acidic water from sulfuric acid tank 72 pumped by pump 74.

The glass slurry is then transferred by a centrifugal pump 76 to an air agitated, water washed, product glass vacuum filter 78. In this filter the glass is separated from the water stream. The purified glass flows into tote bins 80 for eventual sale. The water from the vacuum filter enters a filtrate receiver 82 where any of the air in the froth is sucked away and vented to the atmosphere by a vacuum pump 84, and the water is transferred by a pump 86 to the recycle water thickener 42.

Figure 3:
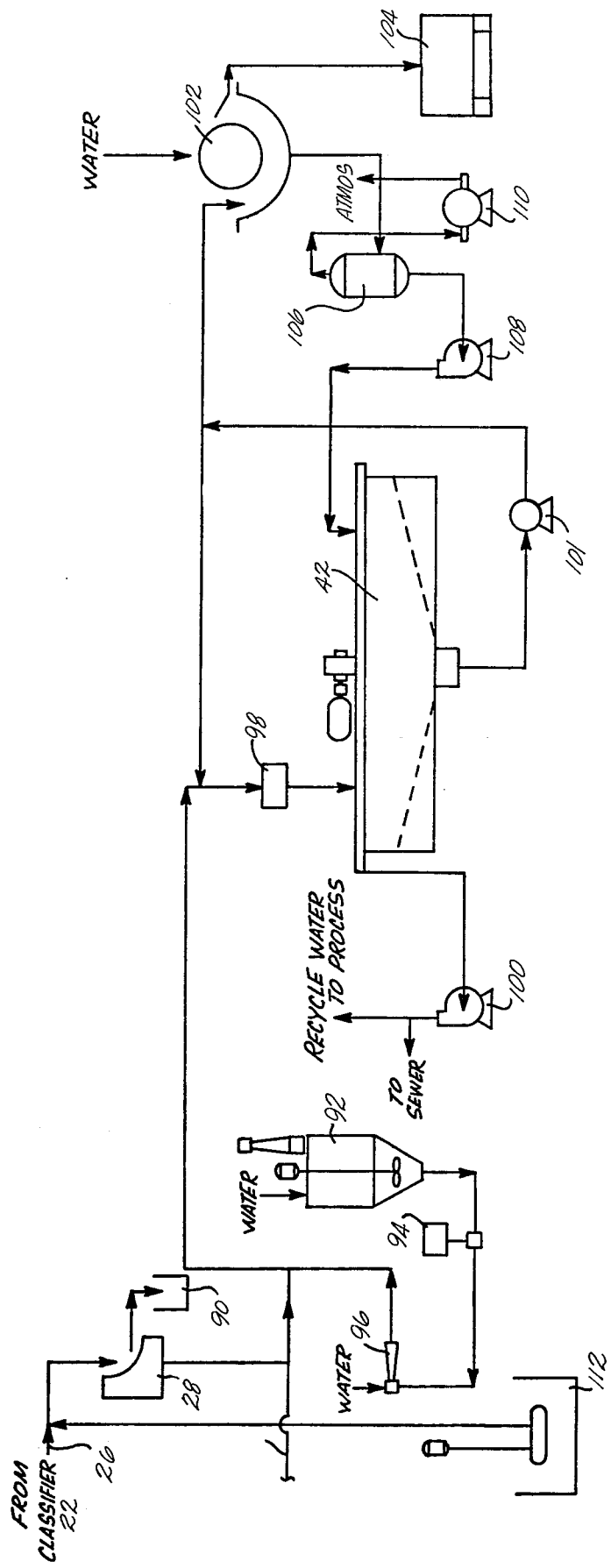
FIG. 3 is a schematic flow diagram illustrating the details of a waste disposal operation in the glass recovery process.

The disposition of the waste water and recycle water 88 is illustrated in FIG. 3. The waste water stream from the first spiral classifier 22 is combined with the recycle water stream after the particles in the waste water are separated out in screen 28 and dropped into a tote bin 90. A flocculating agent is combined with utility water in an agitated tank 92 and pumped by a plunger type metering pump 94 to a venturi 96 where additional water is added. The flocculating agent and utility water are then combined with the recycle water stream 88.

The recycle water stream 88 with the flocculating agent flows through a magnetic flocculator 98 which flocculates the ferrous particles. The flocculated particles and other heavy particles settle to the bottom of a recycle water thickener 42. Clear water is removed from the top of the thickener and returned by a recycle water pump 100 to the process for use wherever recycle water is used, as described above, thereby producing a closed recycle water loop. Any excess water is transferred to the plant sanitary sewer system.

The bottom in the thickener 42 can contain a high percentage of particles. The bottoms are pumped by pump 101 through a filter 102 and sludge is filtered out and collected in tote bins 104 for landfill. The filter 102 is washed with water. The water stream from the sludge filter 102 enters a receiver tank 106 from which it is pumped back by pump 108 to the recycle water thickener 42 to store the water for reuse. Any gas or air in the recycle water in the receiver tank 106 is removed by a vacuum pump 110.

Water entering the pump sewer system such as the water from the overhead of the thickener enters a water collection sump 112 in which most of the particulate matter settles to the bottom. Relatively clear water is pumped from the sump to the dewatering sieve 28 for further purification and use in the recycle water system. The particulates settled to the bottom of the sump are removed by a vacuum truck (not shown).

What is claimed is:

1. In a process for the treatment of solid waste which includes forming a glass-rich fraction containing glass, inorganic, and organic constituents, the method of recovery of purified glass from the glass-rich fraction which comprises:
   a. passing the glass-rich fraction to a screw classifier zone wherein the glass-rich fraction is moved countercurrent to water flow to separate the organic constituents from the glass-rich fraction;
   b. feeding the organics-free, glass-rich fraction from the screw classifier zone to a screen classifying zone;
   c. screening the organics-free glass-rich fraction in the screen classifying zone to form a first rejected organics-free glass containing coarse particles which are greater than a first predetermined mesh size and pass particles less than the first predetermined mesh size;
   d. comminuting the rejected organics-free glass containing coarse particles to enable further screening classification;
   e. returning the comminuted glass containing coarse particles to the screening zone to classify the particle into a second rejected fraction containing coarse particles fraction for discard and a third rejected fraction containing particles greater than the first predetermined mesh size range for communication and pass particles finer than the first predetermined mesh size for combining the passed particles from step (c) for further classifying to remove finer particles less than a second preselected mesh size to provide particles between the first predetermined and second preselected mesh sizes for froth flotation;
   f. classifying the combined passed particles of step (e) to remove the finer particles less than the second preselected mesh size; and
   g. subjecting the resultant mixture from step (f) to froth flotation in the presence of at least a beneficiating amount of a collector reagent for glass to form a float containing predominantly glass and an essentially glass-free tailing.

2. The process according to claim 1 in which the particles removed prior to flotation are of a size greater than about 20 mesh and less than about 325 mesh.

3. The process according to claim 1 in which the second rejected fraction of the screen classifying zone are particles of a size greater than about ¼ inch;
   in which the particles in the third rejected fraction are of a size between about ¼ inch and about 20 mesh; and
   in which the particles between the first predetermined and second preselected mesh sizes are particles of a size between about 20 mesh and about 325 mesh.

4. In a process for the treatment of solid waste which includes forming a glass-rich fraction containing glass and inorganic and organic constituents, the method of recovery of purified glass from the glass-rich fraction which comprises:
   a. passing the glass-rich fraction to a classifier zone to separate the organic constituents from the glass-rich fraction;
   b. passing the organics-free, glass-rich fraction to a screen separation zone to reject coarse particles of a size greater than about ¼ inch;
   c. screening the remainder of the particles from step (b) into a first glass-rich fraction containing particles of a size greater than about 20 mesh and a second glass-rich fraction containing particles of a size less than about 20 mesh;
   d. comminuting the first glass-rich fraction containing particles greater than about 20 mesh;
   e. recycling the comminuted particles back to the screen separation zone and repeating steps (b) and (c);
   f. classifying screened particles finer than 20 mesh to remove fine particles of a size less than about 325 mesh; and
   g. subjecting the resultant mixture of particles in the size range of about 20 mesh to about 325 mesh to froth flotation in the presence of at least a beneficiating amount of a collector reagent for glass to form a float containing predominantly glass and an essentially glass-free tailing.

5. The process according to claim 4 including passing the initial glass-rich fraction to a screw classifier zone wherein the glass-rich fraction is moved countercurrent to water flow to separate the organic constituents from the glass-rich fraction.

6. In a process for the treatment of solid waste which includes forming a first glass-rich fraction containing glass, inorganic, and organic constituents, and a second glass-rich fraction from a predominantly organic fraction; the method of recovery of purified glass from said first and second glass-rich fractions which comprises:
   a. degreasing the second glass-rich fraction;
   b. passing the first glass-rich fraction and the degreased second glass-rich fraction to a classifier zone to separate the organic constituents from the glass-rich fractions;
   c. comminuting the organics-free, glass-rich fraction produced in step (b) to enable screen classification;
   d. screening the comminuted organics-free, glass-rich fraction to remove coarse particles of a size greater than about 20 mesh;
   e. classifying the residue from step (d) to remove fine particles of a size less than about 325 mesh; and
   f. subjecting the resultant mixture after removal of the coarse and fine particles to froth flotation in the presence of at least a beneficiating amount of a collector reagent for glass to form a float containing predominantly glass and an essentially glass-free tailing.

7. The process according to claim 6 in which the first and second glass-rich fractions are passed to a screw classifier zone in which the glass fractions are moved countercurrent to water flow to separate the organic constituents from the glass-rich fractions.

8. In a process for the treatment of solid waste which includes forming a first glass-rich fraction containing glass, inorganic, and organic constituents and a second glass-rich fraction from a predominantly organic fraction, the method of recovery of purified glass from the first and second glass-rich fractions which comprises:
   a. degreasing the second glass-rich fraction;
   b. combining the second glass-rich fraction with the first glass-rich fraction;
   c. passing the combined glass-rich fractions to a screw classifier zone wherein the glass-rich fractions are moved countercurrent to water flow to separate the organic constituents from the glass-rich fractions;
   d. comminuting the organics-free glass-rich fraction to enable screening classification;
   e. screening the organics-free glass-rich fraction to remove coarse particles greater than a first predetermined mesh size;
   f. classifying the residue from step (c) to remove fine particles less than a second preselected mesh size; and
   g. subjecting the resultant mixture after removal of the coarse and fine particles to froth flotation in the presence of at least a beneficiating amount of a collector reagent for glass to form a float containing predominantly glass and an essentially glass-free tailing.

9. The process according to claim 8 in which the particles removed prior to flotation are of a size greater than about 20 mesh and less than about 325 mesh.

10. In a process for the treatment of solid waste which includes forming a glass-rich fraction containing glass, inorganic, and organic constituents, the method of recovery of purified glass from the glass-rich fraction which comprises:
   a. passing the glass-rich fraction to a screw classifier zone wherein the glass-rich fraction is moved countercurrent to water flow to separate the organic constituents from the glass-rich fraction;
   b. screening the organics-free glass-rich fraction to remove coarse particles greater than a first predetermined mesh size;
   c. comminuting the removed coarse particles fraction to enable further screening classification;
   d. screening the comminuted removed coarse particles to remove particles greater than the first predetermined mesh size;
   e. classifying the residue from steps (b) and (d) to remove fine particles less than a second preselected mesh size; and
   f. subjecting the resultant mixture from step (e) to froth flotation in the presence of at least a beneficiating amount of a collector reagent for glass to form a float containing predominantly glass and an essentially glass-free tailing.

11. In a process for the treatment of solid waste which includes forming a first glass-rich fraction from a predominantly organic fraction and a second glass-rich fraction containing glass, inorganic, and organic constituents, the method of recovery of purified glass from the first and second glass-rich fraction which comprises:
   a. degreasing the first glass-rich fraction of the predominantly organic fraction and passing said degreased first glass-rich fraction to a classifier zone;
   b. combining the second glass-rich fraction with the degreased first glass-rich fraction in the classifier zone to separate the organic constituents from the combined glass-rich fractions;
   c. screening the organics-free combined glass-rich fractions to remove coarse particles greater than a first predetermined mesh size;
   d. comminuting removed coarse particles fraction to enable further screening classification;
   e. screening the comminuted removed coarse particles to remove particles greater than the first predetermined mesh size;
   f. classifying the residue from steps (b) and (d) to remove fine particles less than a second preselected mesh size; and
   g. subjecting the resultant mixture from step (e) to froth flotation in the presence of at least a beneficiating amount of a collector reagent for glass to form a float containing predominantly glass and an essentially glass-free tailing.

12. In a process for the treatment of solid waste which includes forming a first glass-rich fraction containing glass, inorganic, and organic constituents; and a second glass-rich fraction from a predominantly organic fraction; the method of recovery of purified glass from the first and second glass-rich fractions which comprises:
   a. degreasing the second glass-rich fraction;
   b. passing the first glass-rich fraction and the degreased second glass-rich fraction to a classifier zone to separate the organic constituents from the glass-rich fractions;
   c. forming from the glass-rich fractions a mixture of glass containing particles of a particle size less than a first predetermined mesh size and greater than a second selected mesh size; and
   d. subjecting the mixture of glass containing particles from step (c) to froth flotation in the presence of at least a beneficiating amount of a collector reagent for glass to form a float containing predominantly glass and an essentially glass-free tailing.

* * * * *

UNITED STATES PATENT AND TRADEMARK OFFICE
CERTIFICATE OF CORRECTION

PATENT NO. : 4,070,273
DATED : January 24, 1978
INVENTOR(S) : Booker W. Morey

It is certified that error appears in the above-identified patent and that said Letters Patent are hereby corrected as shown below:

Column 6, lines 9 and 10, for "communication" read -- comminution --. Column 7, line 35, after "and" delete "and". Column 8, line 32, after "fractions;" delete "pl"; line 54, after "comprises:" delete "pl".

Signed and Sealed this

Eleventh Day of July 1978

[SEAL]

Attest:

RUTH C. MASON
*Attesting Officer*

DONALD W. BANNER
*Commissioner of Patents and Trademarks*